Figure 1:
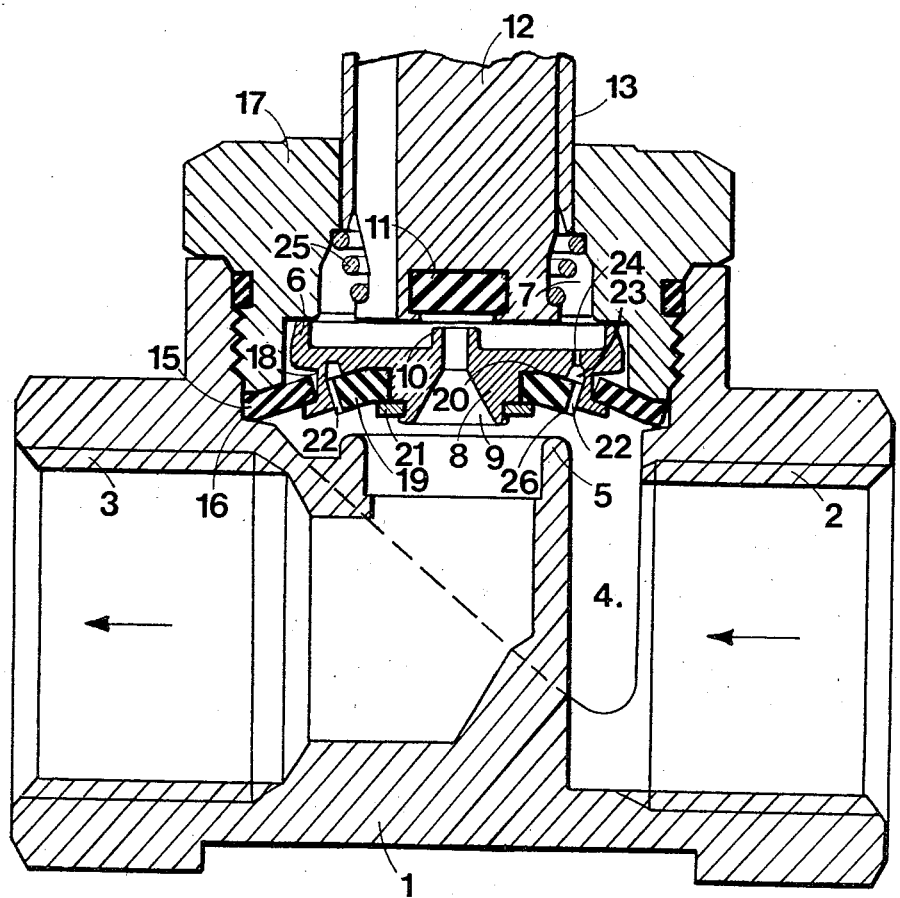

United States Patent [19]

Stampfli

[11] 4,351,509
[45] Sep. 28, 1982

[54] VALVE WITH SERVO-COMMAND

[76] Inventor: Harald Stampfli, 51, chemin des Coudriers, CH-1209 Petit-Saconnex Geneva, Switzerland

[21] Appl. No.: 179,289

[22] PCT Filed: Apr. 5, 1979

[86] PCT No.: PCT/CH79/00052
§ 371 Date: Dec. 6, 1979
§ 102(e) Date: Nov. 15, 1979

[87] PCT Pub. No.: WO79/00896
PCT Pub. Date: Nov. 15, 1979

[30] Foreign Application Priority Data

Apr. 6, 1978 [CH] Switzerland ............... 3693/78

[51] Int. Cl.³ ............... F16K 31/40; F16K 31/385
[52] U.S. Cl. ............... 251/38; 251/30; 251/45
[58] Field of Search ............... 251/38, 45, 30

[56] References Cited

U.S. PATENT DOCUMENTS

| 1,521,354 | 12/1924 | Burns | 251/45 X |
| 3,076,630 | 2/1963 | Hammond | 251/30 |
| 3,784,154 | 1/1974 | Ostrowski | 251/30 |
| 3,872,878 | 3/1975 | Kozel et al. | 251/45 X |

FOREIGN PATENT DOCUMENTS

| 2014087 | 11/1970 | Fed. Rep. of Germany |  |
| 1182622 | 1/1959 | France | 251/45 |
| 1258453 | 3/1961 | France | 251/38 |

Primary Examiner—Arnold Rosenthal
Attorney, Agent, or Firm—Emory L. Groff, Jr.

[57] ABSTRACT

The invention concerns a valve with servo-command, consisting of a seat (5) and a poppet valve (6) mounted in a valve body (1). Movements of the poppet valve (6) are prompted by the pressure prevailing in the control chamber (7). The intake of fluid under pressure in this chamber (7) takes place through an intake conduit (22) which opens across from the upstream edge of the seat (5) in relation to the direction of flow of the fluid, in proximity to the smallest cross section for passage of the fluid for all the possible positions of the poppet valve in relation to the seat (5).

3 Claims, 2 Drawing Figures

VALVE WITH SERVO-COMMAND

There already exist known valves with servo-command, consisting of a seat and a main poppet valve mounted in a valve body, with the movements of the poppet valve being controlled by a moving piece which causes the pressure prevailing in a control chamber to change, said chamber being supplied with fluid under pressure through a passage connecting it with a pressurized fluid intake conduit, passage of the fluid being controlled by the valve, such controlled passage allowing for release from the control chamber through an exhaust system.

In such known valves, at the moment the valve closes the fluid pressure upstream from the seat increases under the effect of the braking thereof. This results in very rapid closing of the poppet valve at the end of the sequence and thus gives rise to hydraulic recoil or water hammer as it is commonly known.

The object of the present invention is to substantially decrease the intensity of this hydraulic recoil and thereby to permit more gentle and gradual closing of the valve.

To that end, the valve according to the invention is characterized by the fact that the intake passage of the fluid under pressure into the control chamber includes an intake conduit which opens across from the edge of the seat which is upstream in relation to the flow of the fluid passing in the valve, said conduit having its mouth near the smallest cross-section area of passage of fluid in the valve in all the possible positions of the poppet valve in relation to the seat.

The attached drawing shows schematically and by way of example one way of executing the valve which is the subject of the invention.

FIG. 1 shows this valve in a cross section in the open position.

Figure 2:
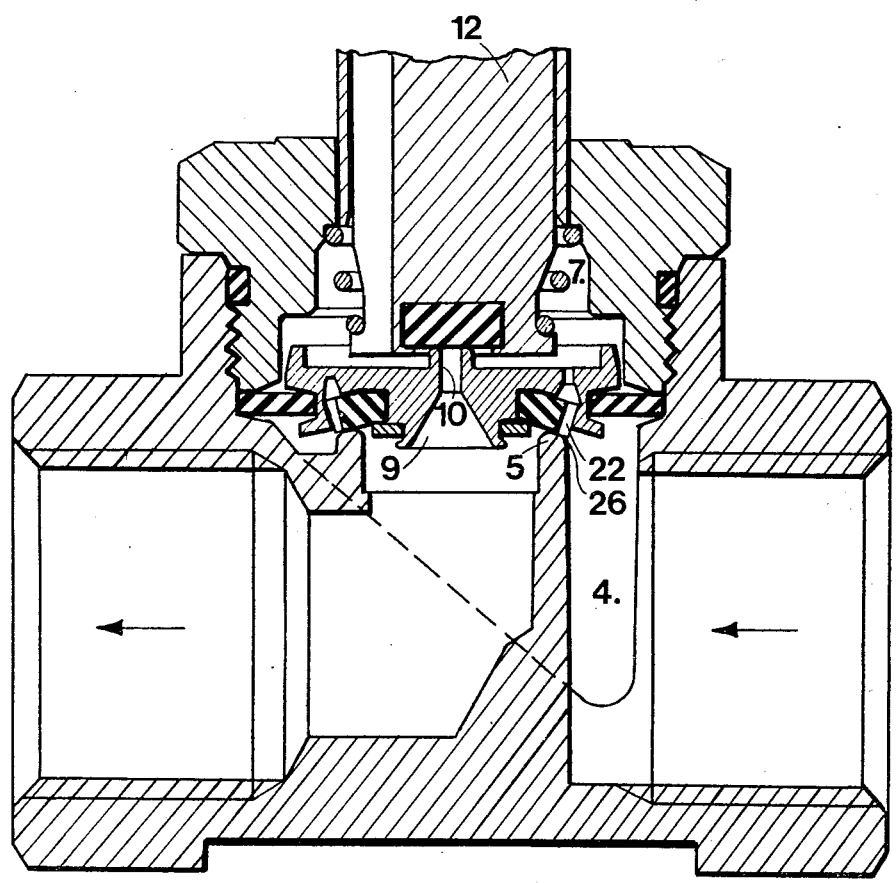

FIG. 2 corresponds to FIG. 1, but shows the valve in the closed position.

The valve includes a body 1 which has two ducts 2 and 3 for intake of the fluid under pressure and exhaust of that fluid, respectively. The fluid arriving via duct 2 enters a ring-shaped chamber 4 surrounding a main seat 5 through which the fluid passes to reach the exhaust duct 3. Passage of the fluid around the seat 5 is controlled by the a poppet valve 6, the movements of which are governed by the effects of the pressure existing in a control chamber 7.

The poppet valve consists of a circular member 8 the central part of which has a passage 9 at one end of which is located a secondary seat 10. This seat 10 may be engaged by a fluid-tight gasket 11 mounted in a movable core 12, the movement of which, inside a tube 13, is caused by a magnetic field generated by a coil (not shown).

The poppet valve 6 is guided by an elastic washer 15 which fits between a seat 16 in the body 1 and a blocking bolt 17. The washer 15 fits, on its inside edge, into a groove 18 in the circular member 8.

Closing of the seat 5 is ensured by a fluid-tight gasket 19, which is ring-shaped, wedged into a housing 20 on the lower surface of piece 8 and held into position by a bushing 21. This gasket 19 has, on its periphery, notches 22 which serve as an intake conduit and provide a connection between the chamber 4 and a ring-shaped slot 23 provided in the housing 20. A calibrated channel 24 in the poppet valve 6 permits a connection between said ring-shaped slot 23 and the chamber 7 located above the poppet valve 6.

The core 12 is pushed toward the poppet valve 6 by a coil spring 25, pressing the gasket 11 against the seat 10. The fluid pressure in the chamber 4 is transmitted to chamber 7 by passing through the notches 22, the ring-shaped slot 23 and the calibrated channel 24. There results a force tending to move the poppet valve 6 in a direction causing the gasket 19 to press against the seat 5.

FIG. 2 shows the valve in the closed position, and it is readily apparent that the notches 22 are open across from the edge of the seat 5, which is upstream in relation to the flow of fluid. In this location, which is close to being the smallest passage for fluid in the valve body for all the possible positions of the poppet valve in relation to the seat 5, the speed of the fluid increases sharply just prior to the closing of the valve. This increase in speed of the fluid in the vicinity of the notches 22 counteracts a sharp increase in pressure in the chamber 7, so that at the end of the movement of the poppet valve 6 it is moving less quickly than in known constructions. The resulting shock upon closure of the valves according to the present invention is quite slight, and tests have shown that hydraulic recoil may be reduced by proportions in excess of 70 percent.

It bears noting that the ring-shaped gasket 19 terminates in a protuberance 26. This leaves an edge oriented in the general direction of the seat 5 which modulates the amount of the fluid fed to the chamber 7 during the closing of the valve, so as to obtain the greatest possible reduction of hydraulic recoil.

As is widely known, the valve is returned to the open position by movement of the core 12 in an upward direction, thus uncovering the seat 10. The chamber 7 is then able to exhaust fluid through passage 9, the cross section of which is greater than that of the calibrated passage 24, and the poppet valve 6 is pushed upward by the pressure prevailing in the ring-shaped chamber 4, said pressure being applied against the circular piece 8 and the ring-shaped washer 15.

It is evident that the described arrangement of the passage of fluid in the valve including the notches 22, the ring-shaped slot 23 and the calibrated channel 24 is advantageous from the standpoint of construction. However, this arrangement is clearly not obligatory, the essential thing being that the intake passage for the fluid under pressure coming into the control chamber 7 have a conduit which opens opposite the edge of the seat 5 upstream in relation to the flow of flow passing through the valve, in proximity to the smallest cross section for the passage of fluid for all positions of the poppet valve in relation to the seat. In an extreme case, this passage could consist of one or two holes drilled in the poppet valve 6 itself and connecting in any appropriate manner with the control chamber 7.

I claim:

1. A valve with servo-control means comprising a valve body, including an intake duct and an exhaust duct for fluid under pressure, a seat and main poppet valve mounted in said body, a control chamber in said body, a movable member controlling the movements of the poppet valve which causes the pressure prevailing in said control chamber to change, said control chamber being supplied with fluid under pressure through a calibrated intake channel connecting it with said pressurized fluid intake duct, said poppet valve having a centrally located passage for escape of the fluid from the control chamber to said exhaust duct characterized by the fact that the intake channel of the fluid under pressure in the control chamber communicates with an intake conduit which is open across from the edge of the seat which is upstream in relation to the flow of the fluid passing through the valve, said intake conduit being disposed in said poppet valve, said intake conduit opening being at the smallest cross section area of passage of fluid in the valve in all of the possible positions of the poppet valve in relation to said seat, said poppet valve including a fluid-tight gasket of elastic material fitted therein, said intake conduit located in said fluid-tight gasket, said poppet valve comprising a circular member including a housing for receiving said fluid-tight gasket, said gasket being ring shaped, the bottom surface of said housing having a ring-shaped slot therein, the diameter of said slot corresponding substantially to the outside diameter of the fluid-tight gasket, the intake conduit in said gasket comprising a plurality of notches on the periphery of said fluid-tight gasket, said notches opening into said ring-shaped slot, which in turn is connected with the upper surface of the circular member through said intake channel.

2. A valve according to claim 1 wherein, the open intake conduit has a downstream edge, in relation to the principal fluid flow and said downstream edge had a protruberance near to and extending in the general direction of said seat.

3. A valve according to claim 1 wherein, said circular member of the poppet valve is guided, in relation to the valve body by a ring-shaped elastic washer which fits, on the one hand, into a circular groove in said ring-shaped member and, on the other hand, into a circular groove in the valve body, said ring-shaped washer providing both guiding for the poppet valve in relation to its seat and fluid-tightness between the poppet valve and the valve body.

* * * * *